United States Patent
Milne et al.

(10) Patent No.: US 10,822,844 B2
(45) Date of Patent: Nov. 3, 2020

(54) LATCH WITH LINEARLY OPERATED LOCK LEVER

(71) Applicants: Robert Milne, Sterling Heights, MI (US); John Rice, New Baltimore, MI (US); Donald M. Perkins, Sterling Heights, MI (US); Ian Dow, Bloomfield, MI (US)

(72) Inventors: Robert Milne, Sterling Heights, MI (US); John Rice, New Baltimore, MI (US); Donald M. Perkins, Sterling Heights, MI (US); Ian Dow, Bloomfield, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 715 days.

(21) Appl. No.: 14/623,441

(22) Filed: Feb. 16, 2015

(65) Prior Publication Data

US 2015/0300053 A1 Oct. 22, 2015

Related U.S. Application Data

(60) Provisional application No. 61/940,065, filed on Feb. 14, 2014, provisional application No. 61/940,147, (Continued)

(51) Int. Cl.
*E05B 81/36* (2014.01)
*E05B 81/24* (2014.01)
(Continued)

(52) U.S. Cl.
CPC ............ *E05B 81/36* (2013.01); *E05B 81/16* (2013.01); *E05B 81/25* (2013.01); *E05B 81/34* (2013.01);
(Continued)

(58) Field of Classification Search
CPC .......... E05B 81/36; E05B 81/16; E05B 85/24; E05B 85/25; E05B 81/34
(Continued)

(56) References Cited

U.S. PATENT DOCUMENTS 3,969,789 A 7/1976 Wize
4,530,185 A * 7/1985 Moriya .................. E05B 81/20
49/280

(Continued)

FOREIGN PATENT DOCUMENTS

CN 101105092 A 1/2008
CN 103195311 A 7/2013
(Continued)

OTHER PUBLICATIONS

CN Office Action dated Jan. 26, 2017 for Applicaiton No. 201510084090.1.
(Continued)

*Primary Examiner* — William C Joyce
(74) *Attorney, Agent, or Firm* — Cantor Colburn LLP

(57) ABSTRACT

An actuator for a latch is provided, the actuator having: a motor operatively coupled to a gear train; and a sector gear pivotally mounted to the actuator and operatively coupled to the gear train, wherein rotational movement of the sector gear is translated into linear movement of a link operatively coupled to the sector gear and wherein linear movement of the link causes a linear movement of a portion of a lock lever operatively coupled to the actuator.

6 Claims, 4 Drawing Sheets

Related U.S. Application Data filed on Feb. 14, 2014, provisional application No. 61/940,421, filed on Feb. 15, 2014, provisional application No. 61/940,422, filed on Feb. 15, 2014.

(51) Int. Cl.
*E05B 81/16* (2014.01)
*E05B 81/34* (2014.01)
*F16H 19/02* (2006.01)
*E05B 81/28* (2014.01)
*E05B 81/06* (2014.01)
*E05B 81/64* (2014.01)

(52) U.S. Cl.
CPC .............. *F16H 19/02* (2013.01); *E05B 81/06* (2013.01); *E05B 81/28* (2013.01); *E05B 81/64* (2013.01)

(58) Field of Classification Search
USPC .................................. 74/89.14, 425; 49/280
See application file for complete search history.

(56) References Cited

U.S. PATENT DOCUMENTS

| | | | | |
|---|---|---|---|---|
| 4,885,954 A | * | 12/1989 | Wanlass | E05B 81/25 250/227.12 |
| 4,968,074 A | * | 11/1990 | Yamagishi | E05B 81/20 292/201 |
| 5,062,312 A | * | 11/1991 | Watanuki | E05B 81/25 192/142 R |
| 5,240,296 A | * | 8/1993 | Kobayashi | E05B 81/25 200/61.62 |
| 6,048,002 A | * | 4/2000 | Ohta | E05B 81/20 292/201 |
| 6,048,003 A | * | 4/2000 | Shimura | E05B 81/20 292/201 |
| 6,065,316 A | * | 5/2000 | Sato | E05B 81/06 292/201 |
| 6,568,741 B1 | | 5/2003 | Leung | |
| 6,679,531 B2 | | 1/2004 | Rogers, Jr. et al. | |
| 8,348,310 B2 | | 1/2013 | Vazquez et al. | |
| 2002/0117863 A1 | * | 8/2002 | Shinkawa | E05B 81/06 292/216 |
| 2008/0164703 A1 | * | 7/2008 | Aubry | E05L 381/14 292/201 |
| 2010/0127512 A1 | | 5/2010 | Vazquez et al. | |
| 2011/0204659 A1 | | 8/2011 | Estrada et al. | |
| 2012/0061976 A1 | * | 3/2012 | Tostado | E05B 77/30 292/200 |
| 2012/0292927 A1 | | 11/2012 | Vazquez et al. | |
| 2014/0292000 A1 | | 10/2014 | Vazquez et al. | |

FOREIGN PATENT DOCUMENTS

| | | | |
|---|---|---|---|
| CN | 203412394 U | | 1/2014 |
| JP | 2005-240480 | * | 9/2005 |
| JP | 2013-7202 | * | 1/2013 |

OTHER PUBLICATIONS

English Machine Translation of Specification and Claims for CN101105092A.
English Machine Translation of Specification and Claims for CN103195311A.
English Machine Translation of Specification and Claims for CN203412394U.
English Translation to CN Office Action dated Jan. 26, 2017 for Applicaiton No. 201510084090.1.

* cited by examiner

LATCH WITH LINEARLY OPERATED LOCK LEVER

CROSS REFERENCE TO RELATED APPLICATIONS

This application claims the benefit of the following U.S. provisional application Ser. No. 61/940,065 filed Feb. 14, 2014; Ser. No. 61/940,147 filed Feb. 14, 2014; Ser. No. 61/940,421 filed Feb. 15, 2014; and Ser. No. 61/940,422 filed Feb. 15, 2014, the contents each of which are incorporated herein by reference thereto.

BACKGROUND

Various embodiments of the present invention relate to a latch and more particularly, a vehicle latch.

In some applications, latches are required to perform numerous operations within limited confines of an application area of the item they are installed in.

Accordingly, it is desirable to provide a latch that is able to perform the required functions while being subject to certain space requirements.

SUMMARY OF THE INVENTION

An actuator for a latch is provided. The actuator having: a motor operatively coupled to a gear train; and a sector gear pivotally mounted to the actuator and operatively coupled to the gear train, wherein rotational movement of the sector gear is translated into linear movement of a link operatively coupled to the sector gear and wherein linear movement of the link causes a linear movement of a portion of a lock lever operatively coupled to the actuator. In another embodiment, the gear train is spring biased into a central or neutral position.

In another embodiment, a vehicle latch is provided. The vehicle latch having: a lock/unlock actuator; a lock lever rotatably mounted to the latch and operatively coupled to the actuator; a sector gear pivotally mounted to the lock/unlock actuator and operatively coupled to a gear train, the gear train being operatively coupled to a motor, wherein rotational movement of the sector gear by the motor is translated into linear movement of a link operatively coupled to the sector gear and the lock lever, wherein linear movement of the link causes linear movement of a portion of the lock lever. In another embodiment, the gear train is spring biased into a central or neutral position.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein.

Figure 1:
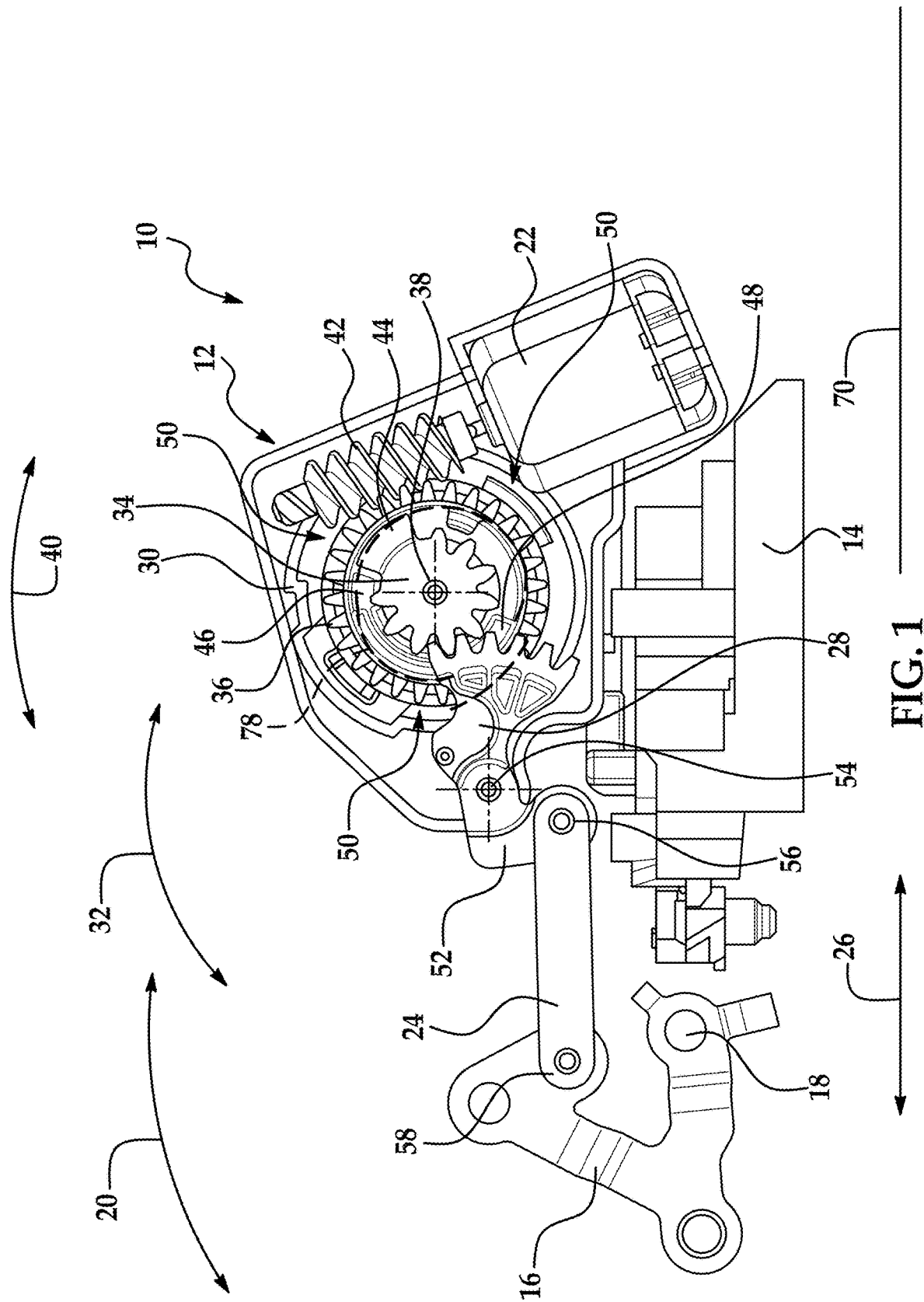
FIGS. 1-4 are views of a latch according to various embodiments of the present invention.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Reference is made to the following U.S. Pat. Nos. 3,969,789; 6,568,741; 6,679,531; 8,348,310 and U.S. Patent Publication Nos. US 2010/0127512; US 2011/0204659; US 2012/0292927 and provisional Patent Application Ser. No. 61/806,530 filed Mar. 29, 2013, the entire contents each of which are incorporated herein by reference thereto.

Referring now to the FIGS. and in particular, FIGS. 1-4, a latch 10 is illustrated. In one embodiment, the latch 10 is a vehicle door latch or any other type of vehicle latch. Latch 10 has an actuator 12 operatively coupled to components of the latch 10 that are located within a latch housing 14.

Latch 10 has a lock lever 16 rotatably mounted to the latch about an axis 18 for movement in the direction of arrows 20. The rotational movement of the lock lever actuates other component(s) of the latch 10, for example a detent lever or pawl that operatively engages a claw or fork bolt of the latch 10. It is, of course, understood that the lock lever 16 may also be configured to operatively engage other components of the latch 10 and the interaction of the lock lever 16 to the detent lever is one of many applications and/or operations that may be used alone or in combination with other features/operations of the latch 10. For example, movement of the lock lever may couple or uncouple a detent lever or pawl of the latch from a release lever or release handle such that movement of the same may either open the latch or have no effect on the latch. In other words movement of the lock lever 16 locks or unlocks the latch by coupling or uncoupling components of the latch through movement of the lock lever.

In one embodiment, the lock lever 16 is driven by a motor 22 of the actuator 12 via linear motion of a movable link 24 in the direction of arrows 26. The moveable link 24 is pivotally connected to the lock lever at one end and a sector gear 28 at the other. The sector gear 28 is pivotally mounted to a housing 30 of the actuator 12 or any other location of the latch 10 such that movement in the direction of arrows 32 is possible. Sector gear 28 is configured to operatively engage a gear 34 rotatably mounted to a worm gear 36 rotatably mounted to the actuator housing 30 for rotation about an axis 38 in the direction of arrows 40. Worm gear 36 is operatively coupled to a worm 42 which is rotatably driven by motor 22. Gear 34 has a protrusion 44 that is located between a pair of features 46 and 48 of worm gear 36 such that as worm gear 36 rotates in one direction (e.g., clockwise) feature 46 will contact protrusion 44 and thus rotate sector gear 28 and accordingly move link 24 linearly such that lock link 16 can be rotated or pivoted. If the rotation of the worm 42 is reversed, the worm gear 36 will rotate counter clockwise and worm gear 36 will rotate and cause counter clockwise rotation of sector gear 28 via feature 48 contacting protrusion 44 and thus causes rotational of pivotal movement of sector gear 28 in an opposite direction to that caused by feature 46 contacting protrusion 44 and thus link 24 is also moved in an opposite linear direction and lock link 16 rotates or pivots in an opposite direction to that when feature 46 contacts protrusion 44. Accordingly and through the rotational movement of the worm gear 36 in the direction of arrows 40 a range of operational movements of components of the latch 10 is possible.

As illustrated, the sector gear 28 is connected or operatively coupled to the lock lever 16 through the movable link 24. The sector gear 28 engages or is operatively coupled to a gear train 50 connected to the drive motor 22. Accordingly, the actuator 12 has a motor drive 22 engaging a gear train 50 to connect with a sector gear 28. The sector gear 28 has an integral arm 52 and rotates about a fixed pivot 54. The arm 52 travels through an arc created by the rotation of the motor 22 and the gear train 50. The motion developed by the gear rotation and the arm 52 develops a linear motion at the end of the arm 52 that equals the linear travel of the lock lever 16. The arm 52 of the sector gear 28 is connected to the lock lever 16 by a link 24 with pivoting connections 56 and 58 allowing for the change between the rotational movement and the linear travel.

This arrangement or design disclosed herein also allows for a compact design. In addition, this design or arrangement also allows for less movable components required to be located between the motor 22 and lock lever 18 thus reducing cost, noise, size requirements, possible wear issues etc. In one embodiment, the actuator 12 is configured to be perpendicularly arranged with respect to a plane 70, which is parallel to or corresponds with housing 14.

As mentioned above, the actuator 12 has motor 22 and worm drive 42 engaging a worm gear 36 with floating pinion gear 34. The pinion gear 34 engages the sector gear 28 that is attached to the link 22. The link 24 is coupled to the lock lever 16 of the latch 10 to move from a locked to unlocked position. A switch 72 is positioned to be actuated by a surface 74 of protrusion 44 as it rotates with gear 34 and actuation of switch 72 will identify the unlocked position of the latch 10 with the capability for an additional switch 76 to be provided to identify a door ajar condition. It is understood, that latch 10 may be configured with only switch 72 or switches 72 and 76 or still other switches. When activated, the motor 22 will drive the gear system or gear train 50, move the link 24 and the latch lever 16. The lever 16 will stay in the locked or unlocked position as the gear train 50 returns to a central position by a spring force of a spring 78 (illustrated schematically by dashed lines) acting on the worm gear 36. In other words, sector gear 28 is not pivoted or rotated until either one of features 46 or 48 contacts protrusion 44. This will occur when the motor 22 is operated in one of two directions and reversing the flow of current to the motor 22 will reverse the direction of the motor 22 and move the latch lever or lock lever 16 in an opposite direction thus, changing the state of the latch 10 from lock to unlock or vice versa. Once the state has been changed the spring 78 will again return the gear train 50 and/or worm gear 36 to a central position while pinon gear 34 remains in the last positon it was moved to by either one of features 46 and 48. In other words, the worm gear 36 is spring biased into a neutral position after it has be rotated either clockwise or counter clockwise from the neutral position by the motor 22.

Gear 34 is rotatably mounted to a worm gear 36 rotatably mounted to the actuator housing 30 for rotation about an axis 38 in the direction of arrows 40. Accordingly, gear 34 can rotate with respect to worm gear 36. Worm gear 36 is operatively coupled to a worm 42 which is rotatably driven by motor 22. Gear 34 has a protrusion 44 that is located between a pair of features 46 and 48 of worm gear 36 such that as worm gear 36 rotates in one direction (e.g., clockwise) from a home or central position and gear 34 is in the position illustrated in FIGS. 1, 2 and 4, feature 46 will contact protrusion 44 and thus rotate sector gear 28 clockwise and accordingly move link 24 linearly such that lock link 16 can be rotated or pivoted.

Figure 2:
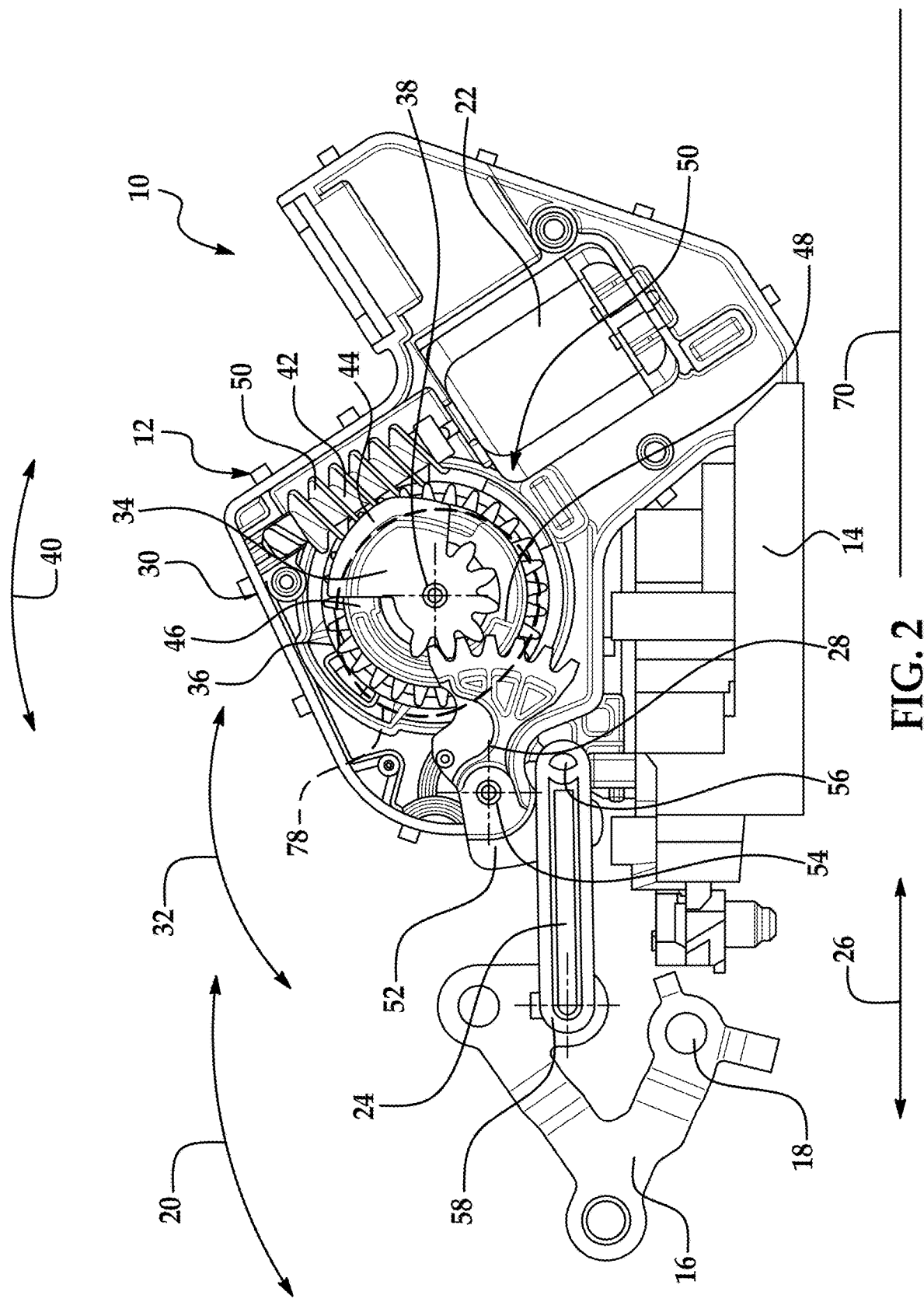
Figure 3:
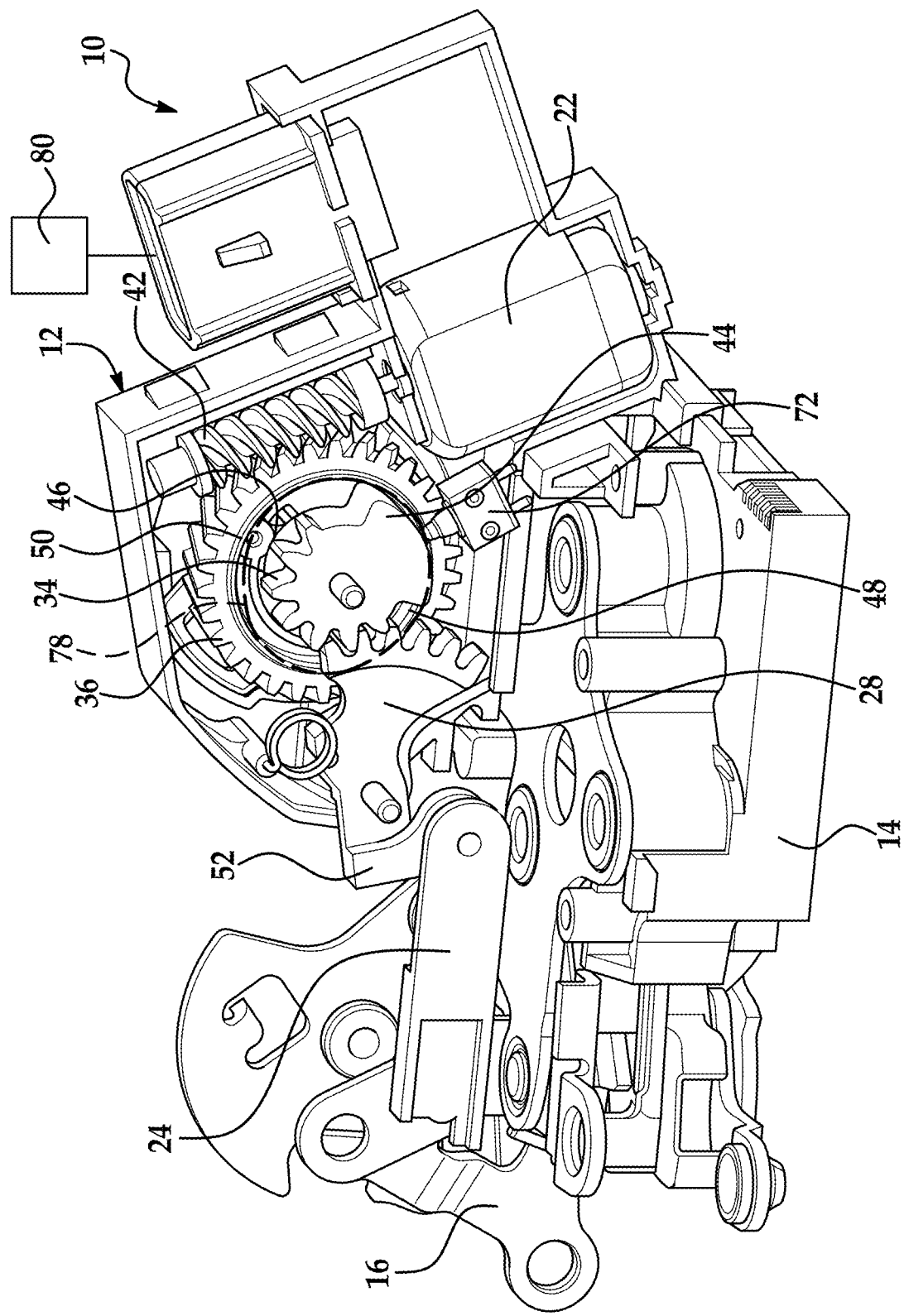
Figure 4:
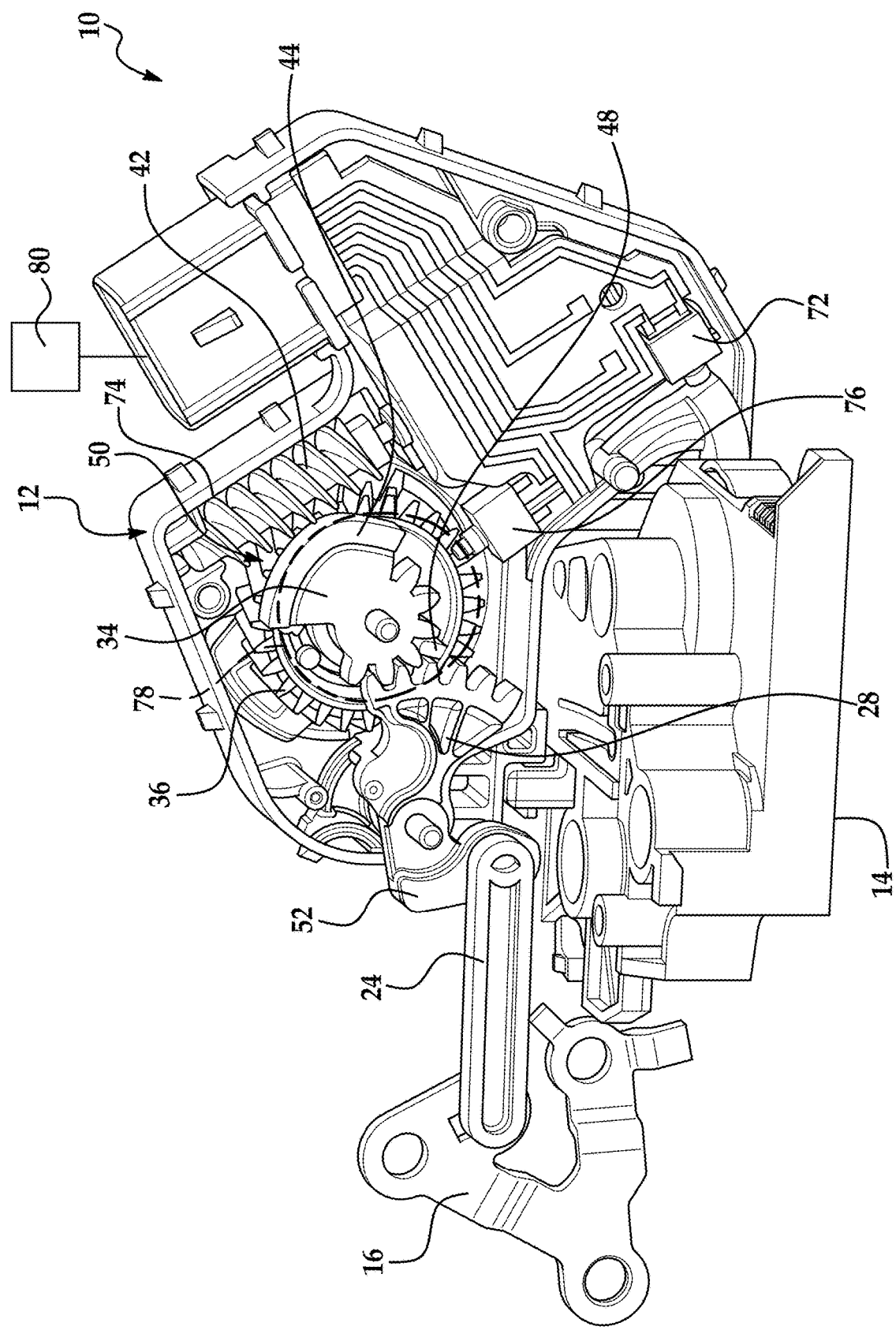

Once, the motor 22 is denergized worm gear 36 rotates counter clockwise back into the central or home position (see at least FIGS. 1-4) via a spring biasing force however, gear 34 will remain in the position illustrated in at least FIG. 3. At this point (e.g., when the worm gear 36 rotates counter clockwise back to the home or central position due to the spring biasing force and gear 34 remains in the position illustrated in FIG. 3) feature 48 is positioned adjacent to protrusion 40 such that counter clockwise rotation of worm gear 36 will cause counter clockwise rotation of gear 34 via feature 48. Thereafter and when the motor is denergized worm gear 36 returns to the home or central position and gear 34 remains in the position illustrated in FIGS. 1, 2 and 4 such that feature 46 is adjacent to protrusion 40 and is ready to move gear 34 via clockwise movement of worm gear 36.

Worm gear 36 is spring biased back into the home or central position by a spring 78 located between worm gear 36 and actuator housing 30. As mentioned above, worm gear 36 is operatively coupled to the worm 42 which is rotatably driven by the motor. Gear 34 is rotatably mounted to worm gear 36 about an axis such that gear 34 can rotate with respect to the worm gear 36 about axis.

If the rotation of the worm 42 is reversed, the worm gear 36 will reverse its rotation and thus cause an appropriate rotation of the sector gear 28 as either feature 46 or 48 contacts protrusion 44 depending on the location of gear 34 and thus causes rotational of pivotal movement of sector gear 28 and link 24 is also moved in a corresponding linear direction. Accordingly and through the rotational movement of the worm gear 36 in the direction of arrows 40 a range of operational movements of components of the latch 10 is possible.

It is noted that the protrusion 44 of FIG. 1 has a slightly different configuration than that illustrated in FIG. 2. It is also noted that the distance between features 46 and 48 is larger than protrusion 44 such that the rotational movement of gear 34 with respect to worm gear 36 is possible. In other words, a radial distance between the pair of features 46 and 48 of the worm gear 36 is greater than a corresponding radial distance of the protrusion 44 located between the pair of features 46 and 48.

Therefore, a latch 10 with an actuator 12 capable of providing full angular travel of the lock lever 16 with linear motion of a link 24 is provided.

Switches 72 and 76 are operatively coupled to a controller or microcontroller 80 that is provided with the states of switches 72 and 76 and can thus operate the motor in the aforementioned opposite directions based upon the states or information received from the switches 72 and 76.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle latch, comprising:
a lock/unlock actuator, the lock/unlock actuator having a housing;
a lock lever rotatably mounted to a housing of the vehicle latch and operatively coupled to the lock/unlock actuator;
a sector gear pivotally mounted to the housing of the lock/unlock actuator and operatively coupled to a gear train, the gear train being operatively coupled to a motor, the gear train and the motor being located within the housing of the lock/unlock actuator and rotational movement of the sector gear by the motor is translated into linear movement of a link operatively coupled to the sector gear and the lock lever, wherein linear movement of the link is translated into linear movement of a portion of the lock lever adjacent to and directly secured to the link, the gear train further comprising: a worm drive operatively coupled to the motor and a worm gear with a pinion gear rotatably mounted to the worm gear, and the pinion gear is operatively coupled to the sector gear that is pivotally attached to the link, the sector gear rotating about a fixed pivot and the sector gear has an integral arm that travels through an arc created by rotation of the motor and the gear train, movement of the integral arm through the arc causes linear motion of an end of the integral arm along a path and the linear motion of the end of the integral arm is equal to the linear movement of the portion of the lock lever, wherein the integral arm is pivotally connected to the link at one end and the lock lever is pivotally connected to an opposite end of the link, and the pinion gear has a protrusion movably located between two separate features of the worm gear, wherein a radial distance between the two separate features of the worm gear is greater than a radial distance of the protrusion and the protrusion contacts a switch operably coupled to a microcontroller when the pinion gear is rotated from a first position to a second position; and
wherein the housing of the lock/unlock actuator is directly secured to the housing of the vehicle latch such that the housing of the lock/unlock actuator is adjacent to and perpendicularly arranged with respect to the housing of the vehicle latch, and wherein the link is an elongated member that is arranged to be parallel to the housing of the vehicle latch.

2. The actuator as in claim 1, wherein the sector gear is operatively coupled to the motor via the worm gear.

3. The actuator as in claim 1, wherein the sector gear is not pivoted or rotated until either one of the two separate features of the worm gear contacts the protrusion of the pinion gear.

4. The vehicle latch as in claim 1, wherein the gear train is spring biased into a central or neutral position.

5. The vehicle latch as in claim 4, wherein linear movement of the portion of the lock lever causes rotational movement of other portions of the lock lever.

6. The vehicle latch as in claim 1, wherein the worm gear is spring biased into a neutral position after it has be rotated either clockwise or counter clockwise from the neutral position.

* * * * *